United States Patent
Beschnitt

(10) Patent No.: US 10,343,521 B2
(45) Date of Patent: Jul. 9, 2019

(54) INDICTOR APPARATUS FOR A VEHICLE COMPONENT

(71) Applicant: Behr-Hella Thermocontrol GmbH, Stuttgart (DE)

(72) Inventor: Alexander Beschnitt, Herford (DE)

(73) Assignee: Behr-Hella Thermocontrol GmbH, Stuttgart (DE)

(*) Notice: Subject to any disclaimer, the term of this patent is extended or adjusted under 35 U.S.C. 154(b) by 0 days.

(21) Appl. No.: 15/776,857

(22) PCT Filed: Nov. 18, 2016

(86) PCT No.: PCT/EP2016/078138
§ 371 (c)(1),
(2) Date: May 17, 2018

(87) PCT Pub. No.: WO2017/085254
PCT Pub. Date: May 26, 2017

(65) Prior Publication Data
US 2018/0326849 A1 Nov. 15, 2018

(30) Foreign Application Priority Data
Nov. 19, 2015 (DE) ...................... 10 2015 222 829.0

(51) Int. Cl.
*F16F 7/12* (2006.01)
*B60K 35/00* (2006.01)
*B60K 37/06* (2006.01)

(52) U.S. Cl.
CPC .............. *B60K 35/00* (2013.01); *B60K 37/06* (2013.01); *F16F 7/12* (2013.01);
(Continued)

(58) Field of Classification Search
CPC .................... B60K 35/00; B60K 37/06; B60K 2350/1028; B60K 2350/106; B60K 2350/941; F16F 7/12
(Continued)

(56) References Cited

U.S. PATENT DOCUMENTS 3,473,997 A * 10/1969 Howitt .............. B32B 17/10036
156/101
6,247,745 B1 * 6/2001 Carroll, III .......... B60N 2/4249
188/371
(Continued)

FOREIGN PATENT DOCUMENTS

DE 7144102 3/1972
DE 195 17 782 C1 6/1996
(Continued)

OTHER PUBLICATIONS

International Search Report and Written Opinion for corresponding Patent Application No. PCT/EP2016/078138 dated Feb. 17, 2017.

*Primary Examiner* — Eric Blount
(74) *Attorney, Agent, or Firm* — Renner, Otto, Boisselle & Sklar, LLP

(57) ABSTRACT

The indicator apparatus (30) for a vehicle component, in particular for a human-human interface for the indicator and, where necessary, for entering operating parameters for a vehicle component, is provided with a housing (12) comprising a front side (14) and a display unit (10), which is arranged on the front side (14) of the housing (12) and/or forms the front side (14) of the housing (12), for displaying operating parameters of a vehicle component and possibly symbols fields for entering commands and operating parameters for a vehicle component. The indicator apparatus (30) is furthermore provided with a deformable delay element (32), arranged in the housing (12) behind the display unit (10), for delaying acceleration movements that act on the
(Continued)

Figure 1:
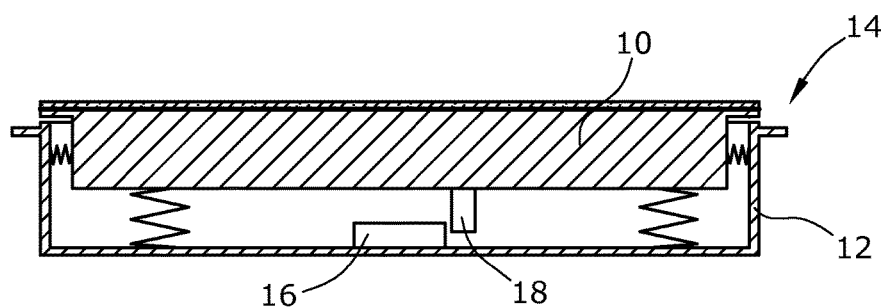

display unit (10) in the direction of the interior of the housing (12) as a result of an object striking the display unit (10). The delay element (32) has a greater stiffness in a center region (34) that is in alignment with the region of the center of the display unit (10) than in a region (36, 38) of the delay element (32) that is in alignment with a region of the display unit (10) that adjoins the region of the center of the display unit (10) and extends in the direction of the edge of the display unit (10) and/or as far as the edge thereof.

18 Claims, 2 Drawing Sheets

(52) U.S. Cl.
CPC .............. *B60K 2350/106* (2013.01); *B60K 2350/1028* (2013.01); *B60K 2350/941* (2013.01); *B60Y 2306/01* (2013.01)

(58) Field of Classification Search
USPC ........................................ 340/461
See application file for complete search history.

(56) References Cited

U.S. PATENT DOCUMENTS

| | | | |
|---|---|---|---|
| 7,359,782 B2* | 4/2008 | Breed | B60R 21/0134 |
| | | | 180/274 |
| 2004/0252473 A1 | 12/2004 | Mitani | |
| 2009/0047470 A1* | 2/2009 | Kuwajima | F16F 1/428 |
| | | | 428/137 |
| 2009/0311523 A1* | 12/2009 | Friedman | B32B 17/10036 |
| | | | 428/339 |
| 2010/0250071 A1 | 9/2010 | Pala et al. | |
| 2011/0210579 A1* | 9/2011 | Marur | B60N 2/42709 |
| | | | 296/187.03 |
| 2014/0196998 A1* | 7/2014 | Nauman | C08L 83/04 |
| | | | 188/377 |

FOREIGN PATENT DOCUMENTS

| | | |
|---|---|---|
| DE | 10 2004 028 058 A1 | 1/2005 |
| DE | 10 2016 101 556 B3 | 7/2017 |
| WO | 2010/021044 A1 | 2/2010 |

\* cited by examiner

INDICTOR APPARATUS FOR A VEHICLE COMPONENT

The present patent application claims the priority of German patent application 10 2015 222 829.0, dated 19 Nov. 2015, the content of which hereby belongs to the present patent application by reference to the subject matter.

The invention relates to a display apparatus for a vehicle component, and in particular for a human-machine interface for the indicator and, where necessary, for entering operating parameters for a vehicle component.

In the interior of vehicles, human-machine interface (HMI or MMI) control panels that in the past were made of plastic or wood are increasingly being replaced by, for example, real glass or even plastic glass panels. The current trend in HMI or MMI control panels such as, for example, climate control panels, is to use functional display assemblies that have a closed control panel. Such display assemblies may have, for example, a plastic covering similar to a glass panel or may be provided with a transparent cover layer made of real glass. In this way the classic plastic operating elements like buttons, rotary knobs, and the like are increasingly being replaced by touchscreens in vehicle interiors.

There are special requirements in the ECE standards for glass surfaces installed in the vehicle. For example, glass surfaces must not splinter if they are destroyed. If a glass surfaces is disposed in the interior of a vehicle in the region in which an occupant could strike his head in an accident, such glass surfaces must be able to yield without splintering, that is, they must not exceed a maximum acceleration delay (ECE Standard R21). The glass surface or display assembly thus must not be too stiff, since otherwise there could be life-threatening negative accelerations if a head strikes it.

DE-C-195 17 782 indicates the combination of a plurality of functional elements in a vehicle instrument panel using a frame, behind which frame is arranged a cross support (support element) of the vehicle support structure, wherein an energy absorber (delay element) is disposed between the frame and the cross support.

DE-A-10 2004 028 058 discloses a design for a control element projecting from a control unit to move back automatically.

Furthermore, U.S. Pat. No. 6,247,745 and DE-U-71 44 102 indicate different embodiments of energy absorbers that may be used as delay elements.

In the past, display assemblies have been installed location-fast and deform only slightly. Generally the only actuation response provided for the operator is acoustic.

However, there are also display control assemblies that provide haptic feedback, i.e., tactile feedback, and that, in addition to a possible acoustic response, provide a "true" movement of the display surface and thus allow operation to be perceivable to the user (force sense force feedback). Fluctuations occur in these systems, since the system is mounted in a resilient manner and is initiated mechanically. To be able to realize especially high value display assemblies, the system mounted in a resilient manner should be as stiff as possible and should be attached to the vehicle as stiffly as possible.

The two requirements, specifically, to mount the system in a relatively yielding manner for maintaining the maximum permissible acceleration delay, but to have to connect it as rigidly as possible to the system in order to provided high quality haptics, are thus mutually contradictory.

The object of the invention is to create an indicator apparatus for a vehicle component, in particular for a human-machine interface for the indicator and, where necessary, for entering operating parameters for a vehicle component, wherein if there is a head impact the indicator apparatus must not exceed the maximum permissible acceleration delay according to the standard. Furthermore, splintering of the material the panel of the display assemblies is made of is to be prevented.

For attaining this object, the invention suggests an indicator apparatus for a vehicle component, especially for a human-machine interface for the display and, where necessary, input of operating parameters for a vehicle component, wherein the indicator apparatus is provided with a housing comprising a front side,
a display unit, which is arranged on the front side of the housing and/or forms the front side of the housing, for displaying operating parameters of a vehicle component and possibly symbol fields for entering commands and operating parameters for a vehicle component, and
a deformable delay (crash) element arranged in the housing behind the display unit for delaying acceleration movements that act on the display unit in the direction of the interior of the housing as a result of an object striking the display unit
wherein the delay element has a greater stiffness in a center region that is in alignment with the region of the center of the display unit than in a region of the delay element that is in alignment with a region of the display unit that adjoins the region of the center of the display unit and extends in the direction of the edge of the display unit and/or as far as the edge thereof.

With the invention, it is therefore suggested that a delay element that is intended to deform plastically if struck by a head be added to a display assembly. The delay element has a greater strength or stiffness in those regions of the indicator apparatus (display assemblies) in which, if struck by a head, maximum deflection is to be expected, generally the center region of the display unit, than in its other regions. Thus, for example, the strength or stiffness of the delay element may decrease towards its edge. Put very simply it may be said that the zones of maximum or greater and lesser strength or stiffness may depend on the position of the expected impact zones of the display unit, which depend e.g. on the installation location.

The variable stiffness or flexibility of the delay element may be added to the element using specific geometry (for instance using different thicknesses, using recesses, or by changing other geometric parameters or dimensions).

In addition the locally different stiffness and flexibility of the delay element may be formed by locally different thicknesses of the delay element and/or by locally different geometries, such as e.g. locally different honeycomb structures and/or locally different perforations, perforation densities, or the like, material weakenings or reinforcements, and/or using other measures for adjusting local stiffness and flexibility.

Finally, the locally different stiffness/flexibility/strength of the delay element may also be realized using the selection of different materials or using special material behavior (for example, thermal treatment) or using a visco-elastic material that reacts with greater stiffness at high rates of strain than at lower rates of strain.

The delay element provided according to the invention is arranged behind the display unit within the housing of the control and/or indicator apparatus and may provide energy-absorbing connection/coupling of the display unit to the or with the vehicle. If it is a display unit with force feedback, the elastic bearing of the display unit by the delay element is not negatively affected. The advantage of using the delay element provided according to the invention in a display assembly may be seen especially in that the force feedback connection of the display unit to the vehicle may be designed as stiff as possible (which itself is advantageous for haptics, since a soft connection permits vibrations in the system, which may then negatively affect haptics), while, if struck by a head, the delay element satisfies its function and the majority of the energy is "absorbed" by deformation of the delay element. The acceleration delay may be appropriately adjusted via the delay element.

The advantage of the invention, inter alia, is that the installation space for functional, indicator, and/or control devices inside the vehicle is not negatively affected, i.e. is not reduced, since no support of these devices beyond the energy absorber in the form of the delay element is required on additional components of the vehicle, e.g. supports, braces, etc., cross-supports, to be arranged on the car body.

As already mentioned in the foregoing, the locally different stiffness/strength and flexibility of the delay element may be realized using locally different thicknesses of the delay element. Alternatively or in addition, it may be provided that the locally different stiffness/strength and flexibility of the delay element may be formed using the selection of materials of different stiffness or flexibility and/or using materials that react with greater stiffness or flexibility depending on the rate of strain or rate of compression, from which materials the delay element is fabricated.

In another advantageous embodiment of the invention it may furthermore be provided that the delay element is embodied plate-shaped, with or without through-holes, or possibly in the form of bars joined to one another.

As already stated in the foregoing, the indicator apparatus according to the invention usefully has a housing that connects the display unit to the vehicle. In the region of its edge, for instance, the delay element is connected to or supported on or in the housing.

In one advantageous embodiment of the invention, the display unit is embodied as a rectangle, when seen from above, and has a rectangular center region, a rectangular edge region, and at least one rectangular intermediate region running between the center region and the edge region. The thickness of the delay element in its center region may be greater than the thickness in the at least one intermediate region. Furthermore, the thickness of the at least one intermediate region may be greater than the thickness of the edge region of the delay element. Alternatively or in addition, the material of the delay element in the center region may be stiffer than that in the at least one intermediate region, while the material of the at least one intermediate region is stiffer than that of the edge region.

The invention may be advantageously used in a control unit as is described in German patent application 10 2016 101 556.3, dated 28 January 2016, the content of which hereby belongs to the present patent application by reference to the subject matter.

Figure 2:
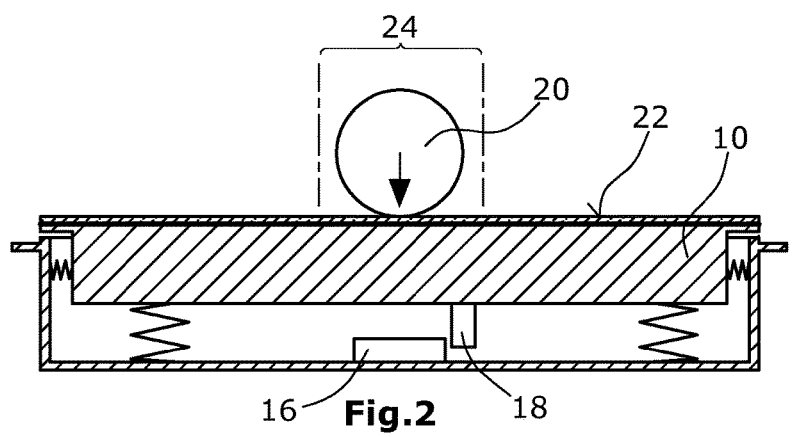
Figure 3:
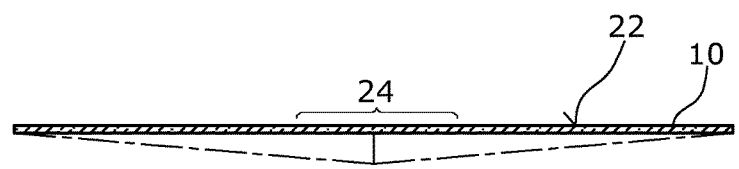
Figure 4:
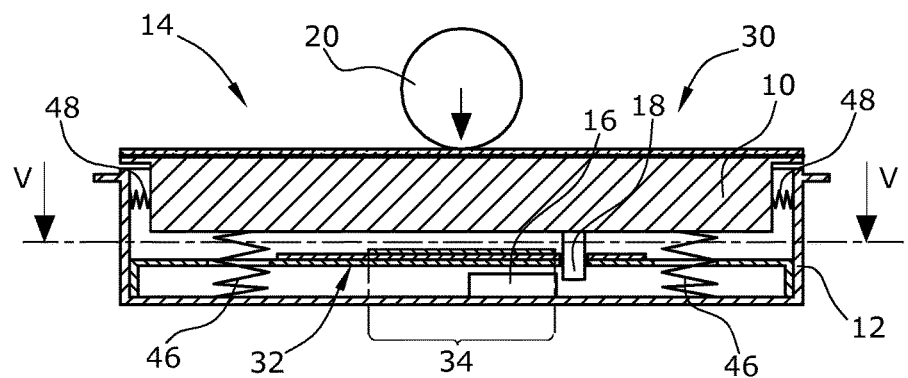
Figure 5:
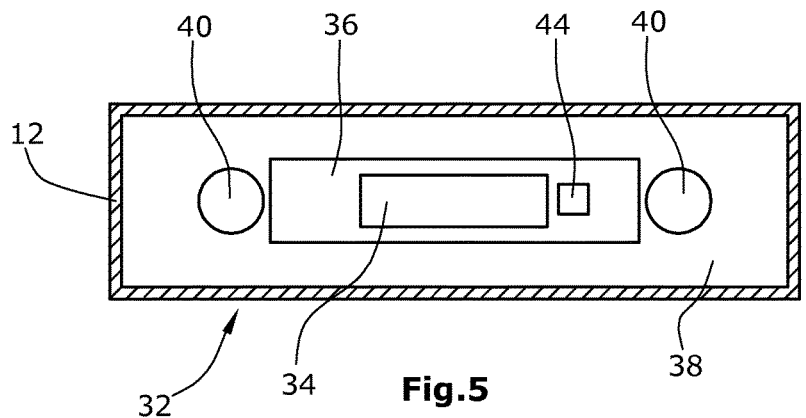

The invention shall be described in greater detail in the following using an exemplary embodiment and with reference to the drawings. Specifically:

FIG. 1 depicts a section through a display assembly having force feedback according to the prior art, FIG. 2 depicts the display assembly according to FIG. 1 in a simulated head impact test, FIG. 3 is a schematic depiction of the, for example, glass control panel of the display assembly with indicated maximum deflection in the center region, FIG. 4 depicts a section through a display assembly having arranged behind the display unit a delay element according to the invention, and FIG. 5 is a top view of the delay element at the elevation of the line V-V in FIG. 4.

FIGS. 1 through 3 schematically depict how, according to the prior art, an indicator apparatus for a vehicle component with force feedback reacts in a head impact test. A display unit 10 is arranged elastically mounted in a housing 12. If the display unit 10, which is arranged on the front side 14 of the housing 12, is actuated, the corresponding movement is sensed in order to provide a haptic response in the form of force feedback when a minimum movement is detected. The corresponding sensor element and movement unit are indicated as 16, 18 in the figures.

If, for the head impact test, a test body 20 now strikes the control or indicator apparatus 22 of the display unit 10, the deflection of the latter is greatest for instance in the center region 24 (see schematic indication in FIG. 3).

FIGS. 4 and 5 illustrate an indicator apparatus 30 embodied according to the invention. Elements of the indicator apparatus 30 that correspond to those of the indicator apparatus according to FIGS. 1 through 3 are identified with the seam reference numbers in FIGS. 4 and 5 as in FIGS. 1 through 3.

According to the invention, disposed behind the display unit 10 within the housing 12 of the indicator apparatus 30 is a delay (crash) element 32, as an energy absorber, that in this exemplary embodiment has its greatest stiffness in the center region 24 of the display unit 10 and is less strong or stiff toward the edge.

The delay element 32 has, for instance in the center region 34 that is in alignment with the center region 24 of the display unit 10, a greater thickness than in an intermediate region 36 surrounding this center region 34, in order then to have a lower thickness, compared to the intermediate region 36, in its edge region 38 surrounding the intermediate region 36. Thus the stiffness/strength/flexibility of the delay element 32 may be adjusted differently locally. Through-holes 40, 44 may be embodied in the plate-shaped delay element 32 in this exemplary embodiment in order to be able to pass mechanical or electrical functional elements therethrough. In the exemplary embodiment, the through-holes 40, 44 e.g. receive springs 46 for, for example, a force sense function. Possibly required additional springs for a force feedback function are not shown. The springs 46 and 48 are merely to symbolize the elastic mounting of the display unit 10 and may consequently also be arranged at a different location and be embodied in any desired form.

Other "distributions" of locally different strengths/stiffnesses/flexibilities of the delay element 32 than those illustrated in FIGS. 4 and 5 are possible according to the invention. The specific distribution to be selected depends on the anticipated impact zones for an indicator apparatus in a vehicle.

REFERENCE LIST

10 Display unit
12 Housing
14 Front side
16 Sensor element/actuator
18 Sensor element/actuator
20 Test body
22 Display panel
24 Center region of display panel
30 Indicator apparatus 32 Delay element
34 Center region of delay element
36 Intermediate region of delay element
38 Edge region of delay element
40 Through-hole in delay element
44 Through-hole in delay element
46 Springs for force sense
48 Springs for force feedback

The invention claimed is:

1. An indicator apparatus for a vehicle component, comprising
a housing comprising a front side,
a display unit, which is arranged on the front side of the housing and/or forms the front side of the housing, for displaying operating parameters of a vehicle component, and
a deformable delay element, arranged in the housing behind the display unit, for delaying acceleration movements that act on the display unit in the direction of the interior of the housing as a result of an object striking the display unit,
wherein the delay element has a greater stiffness in a center region that is in alignment with the region of the center of the display unit than in a region of the delay element that is in alignment with a region of the display unit that adjoins the region of the center of the display unit and extends in the direction of the edge of the display unit.

2. The indicator apparatus according to claim 1, wherein the greater stiffness in the center region of the delay element is formed by locally different thicknesses of the delay element.

3. The indicator apparatus according to claim 1, wherein the greater stiffness in the center region of the delay element is formed using the selection of materials of different stiffness or flexability.

4. The indicator apparatus according to claim 1, wherein the delay element is plate-shaped.

5. The indicator device according to claim 1, wherein the display unit is rectangular, when seen from above, and has a rectangular center region, a rectangular edge region, and at least one rectangular intermediate region running between the center region and the edge region, in that the thickness of the delay element in the center region is greater than that in the at least one intermediate region and the thickness of the at least one intermediate region is greater than that of the edge region or in that the material of the delay element in the center region is stiffer than that in the at least one intermediate region, and the material of the at least one intermediate region is stiffer than that of the edge region.

6. The indicator device according to claim 1, wherein the delay element, in the region of its edge and/or in the housing, is connected thereto and/or supported thereon.

7. The indicator apparatus according to claim 1, wherein the greater stiffness in the center region of the delay element is formed by locally different geometries of the delay element.

8. The indicator apparatus according to claim 1, wherein the delay element includes means for providing locally different stiffnesses and flexibilities of the delay element.

9. The indicator apparatus according to claim 1, wherein the locally different greater stiffness in the center region of the delay element is formed using materials that react with greater stiffness or flexibility depending on the rate of strain or rate of compression, from which materials the delay element is fabricated.

10. The indicator device according to claim 4, wherein the delay element has through-holes.

11. The indicator device according to claim 1, wherein the delay element is in the form of bars joined to one another.

12. The indicator apparatus according to claim 1, wherein the greater stiffness in the center region of the delay element is formed by locally different locally different honeycomb structures.

13. The indicator apparatus according to claim 1, wherein the greater stiffness in the center region of the delay element is formed by locally different perforations.

14. The indicator apparatus according to claim 1, wherein the greater stiffness in the center region of the delay element is formed by locally different perforation densities.

15. The indicator apparatus according to claim 1, wherein the greater stiffness in the center region of the delay element is formed by locally different material weakenings.

16. The indicator apparatus according to claim 1, wherein the greater stiffness in the center region of the delay element is formed by locally different reinforcements.

17. The indicator apparatus according to claim 1, configured for use as a human-machine interface.

18. The indicator apparatus according to claim 17, configured for entry of operating parameters.

* * * * *